Jan. 4, 1938.　　　　F. W. ROBINSON　　　　2,104,274
FLUID PACKED PLUNGER FOR PUMPS
Filed Jan. 7, 1935　　　　2 Sheets-Sheet 1

Inventor
Frederick W. Robinson
By Eugene E. Stevens Atty.

Jan. 4, 1938.  F. W. ROBINSON  2,104,274
FLUID PACKED PLUNGER FOR PUMPS
Filed Jan. 7, 1935  2 Sheets-Sheet 2
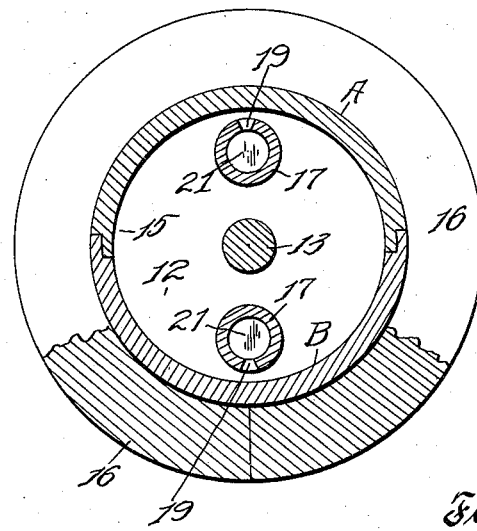
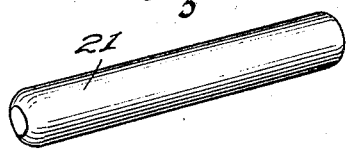
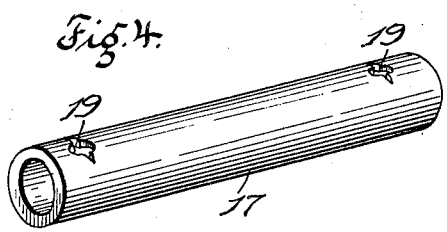
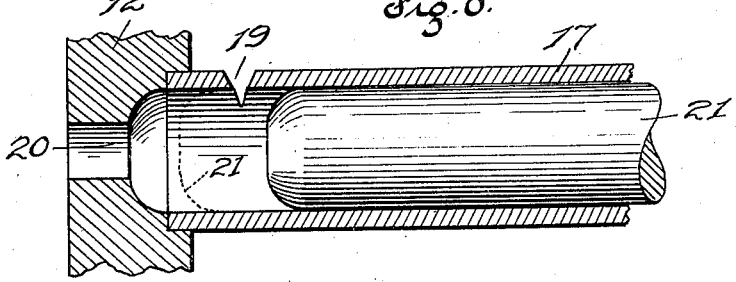
Inventor
Frederick W. Robinson
By Eugene C. Stevens Atty.

Patented Jan. 4, 1938

2,104,274

UNITED STATES PATENT OFFICE 2,104,274

FLUID PACKED PLUNGER FOR PUMPS

Frederick W. Robinson, Jenks, Okla., assignor of one-fourth to Fredrick W. Bailey, one-tenth to Henry Hone, and one-tenth to R. G. McDonough, all of Tulsa, Okla.

Application January 7, 1935, Serial No. 720

4 Claims. (Cl. 309—23)

This invention relates to improvements in a fluid packed pump and has for its object a means provided in the packing head by which the fluid being pumped is admitted to enter the packing head and cause an outward pressure of the packing material so as to provide a perfect communication between the packing head and the inner periphery of the cylinder.

Another object is the general construction, arrangement and combination of parts which, when combined, produce the result required.

The essential feature of the invention is to construct a packing head or plunger with a divided ring supporting the packing material, and a means whereby the liquid in the cylinder being handled by the pump and while in the act of compression, a portion is permitted to enter the interior of the packing head and exert its pressure on the packing material. The inlet means being so arranged as to operate while the packing head is being operated in either direction.

My improvement consists in the novel arrangement, construction and combination of parts as will be more fully hereinafter described, definitely pointed out in the claims and illustrated by the accompanying drawings, in which similar reference characters or numerals indicate similar parts in each of the several views.

Figure 3 is a vertical cross-sectional view of the packing head taken on the line 3—3 of Figure 2;

Figure 4 is a detail perspective view of a valve sleeve made use of;

Figure 5 is a detail perspective view of the valve plunger operating in the valve sleeve; and Figure 6 is an enlarged detail sectional view of a portion of the valve mechanism in its relative position with the end plates of the packing head.

Figure 1:
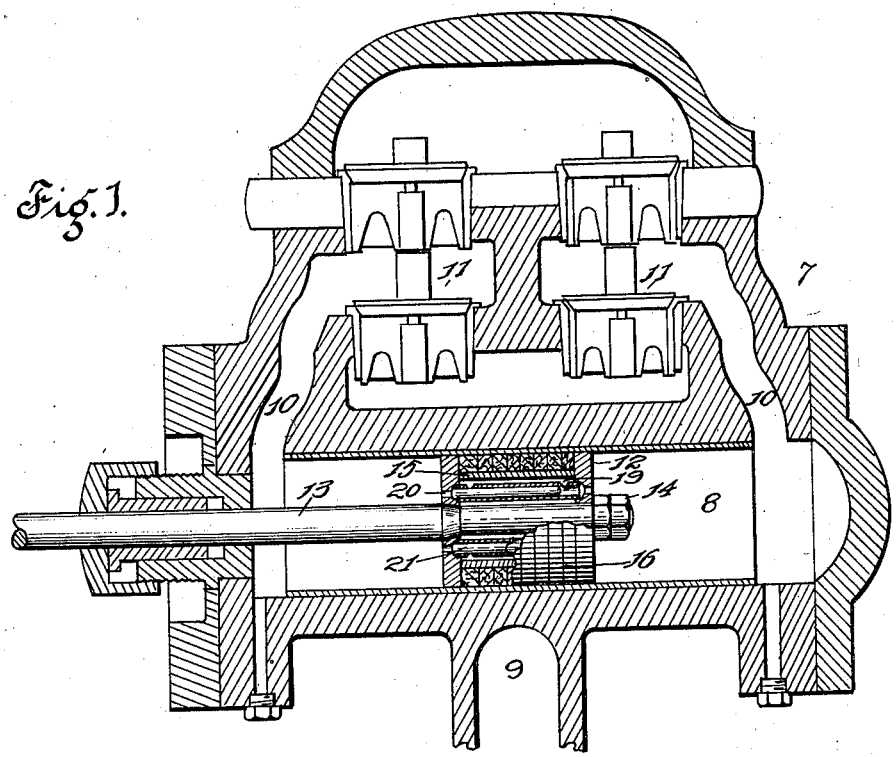
Figure 1 is a vertical sectional view of a pump housing showing my improved packing head in position therein.

In the drawings, 7 represents an ordinary pump housing comprising a cylinder 8, an inlet 9, discharge ports 10 and valves 11, all of which are of the general construction.

In the cylinder 8 is placed my improved packing head consisting of a pair of end or head plates 12 mounted on a connecting rod 13 and held in secure position by the nuts 14 and connected to the piston rod in the steam head.

Between the end plates is positioned a ring 15 arranged preferably of two sections A and B, their connecting ends being preferably arranged with overlapping construction so as to hold the same together and in place, acting as a support for the packing material.

On the outer periphery of the divided ring is placed the usual packing material 16 such as fabric, rubber, leather or other suitable material, and by the application of the packing material, the ring is held in central position between the end plates of the packing head.

Within the packing head, positioned between the end plates and inside of the divided ring are tubes or sleeves 17, preferably two in number, they are held in set position by the ends resting in depressions 18 formed in the end plates, and in the sleeves are formed openings 19 through which the liquid is permitted to pass inside the packing head through the communicating ports 20 formed in the end plates 12.

Within each sleeve 17 is located a plunger 21 fitted to freely slide within the sleeve, its movement being governed by liquid pressure and is moved in accordance with the forward or backward action of the packing head. The ends of the plungers are formed to correspond with the inner surface of the openings 20 of the end plates.

The operation of the invention is as follows:

The packing head having been once assembled and placed within the pump cylinder, and the motive power placing the same in its reciprocatory action, the fluid drawn into the cylinder to be discharged under pressure through the discharge valves has a tendency to permit a portion thereof to enter the openings 20 and fill the interior of the head.

Figure 2:
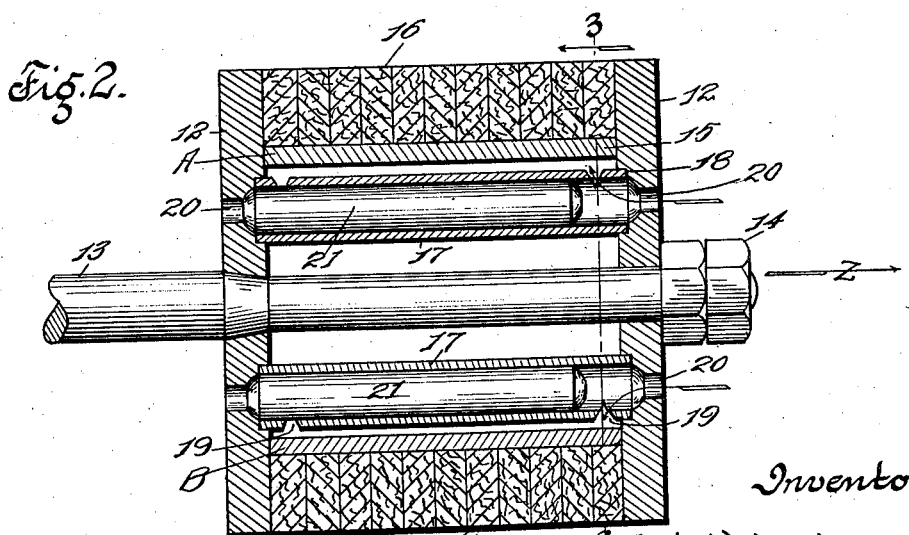
Figure 2 is a detail section view of my complete packing head.

As the packing head is being reciprocated, the valve plungers 21 are placed in action by the fluid pressure, should the packing head be moving in the direction of the arrow Z, the plungers are forced to the opposite end of the sleeves closing the openings at that end, and opening the openings on opposite end thereby permitting the liquid to pass into the packing head as shown by the arrows in the Figure 2, exerting its pressure against the interior of the split or divided ring 15, and it in turn pressing against the packing material causing it to contact snugly and tightly against the inner peripheral surface of the cylinder wall.

Upon the return motion of the packing head, plungers 21 move in the opposite direction permitting the fluid to exert its pressure through the openings of the opposite end, thus by reciprocatory action of the packing head, the plungers 21 automatically operate opening one end and closing the other thereby retaining a pressure within the packing head equivalent to the pressure within the cylinder.

The essential feature is to construct a packing head to retain snug fit within the cylinder by means of the pump pressure exerted within the packing head and against the under surface of the packing elements.

What I claim is:

1. In a fluid pump plunger, a head comprising spaced end plates rigidly mounted on a connecting rod extending axially therethrough, each of said plates being provided on its inner face with a socket, the sockets being disposed in alignment, a hollow tubular spacer sleeve disposed between said plates and seated at each end in said socket, said plates being provided with ports extending from their outer faces in axial communication with said spacer sleeve, a valve member slidably mounted within said sleeve for reciprocation therein, the length of said valve member being appreciably less than the length of said sleeve, the walls of said sleeve being formed to provide ports extending therethrough adjacent each end thereof, and an expandible ring disposed between said end plates in concentric relation with said connecting rod and being disposed outwardly of said spacer sleeve, and a fibrous packing material supported on and carried by said ring between said plates.

2. In a fluid pump plunger for a cylinder comprising a piston head having end plates, a connecting rod supporting the same, valve sleeves supported between the end plates and providing means for maintaining a proper spacing of said plates, openings in said plates and sleeves, valve plungers located in the sleeves for controlling the admission of fluid pressure from the cylinder to the piston head through said openings formed in the ends of said plates and sleeves, a divided ring positioned between the end plates and outside of the valve sleeves, and packing material supported on the outer periphery of the divided ring.

3. In a fluid pump plunger for a cylinder comprising a piston head having end plates, a connecting rod supporting the same, at least one valve sleeve supported between the end plates and providing means for maintaining a proper spacing of said plates, openings in said plates and sleeve, a valve plunger located in said sleeve for controlling the admission of fluid pressure from the cylinder to the piston head through said openings formed in the ends of said plates and sleeve, and non-metallic packing for said piston head, and means whereby said packing is expanded by the fluid pressure admitted to said piston head.

4. In a fluid pump plunger for a cylinder, comprising a piston head having end plates, a connecting rod supporting the same, at least one tubular valve assembly supported between the end plates and providing means for maintaining a proper spacing of said plates, openings in said end plates communicating with said valve assembly, said valve assembly comprising means for controlling the admission of fluid pressure from the cylinder to the interior of said piston head, packing for said piston head, and means whereby said packing is expanded by the fluid pressure admitted to said head.

FREDERICK W. ROBINSON.